United States Patent [19]

McLeod

[11] Patent Number: 5,794,423

[45] Date of Patent: Aug. 18, 1998

[54] MOBILE HARVESTER FOR CHAFF, GRAIN, GRAIN LEAVINGS AND WEED SEEDS

[75] Inventor: Robert H. McLeod, Winnipeg, Canada

[73] Assignee: Bob McLeod Inc., Winnipeg, Canada

[21] Appl. No.: 742,622

[22] Filed: Nov. 1, 1996

[51] Int. Cl.$^6$ ............................................. A01D 41/06
[52] U.S. Cl. ........................... 56/14.6; 56/122; 460/65; 460/79; 460/97
[58] Field of Search ................................ 56/14.6, 14.5, 56/194, 122, DIG. 1, DIG. 2; 460/23, 65, 75, 59, 79, 97, 85, 111, 112, 118, 119, 149, 150, 903

[56] References Cited

U.S. PATENT DOCUMENTS 3,580,257  5/1971  Teague ..................................... 460/85

FOREIGN PATENT DOCUMENTS

| 638703 | 3/1962 | Canada | ..................... 460/65 |
| 1047876 | 2/1979 | Canada . | |
| 1053528 | 5/1979 | Canada . | |
| 1094904 | 2/1981 | Canada . | |
| 1112975 | 11/1981 | Canada . | |
| 1952567 | 6/1971 | Germany | ..................... 56/16.4 D |
| 3528638 | 2/1987 | Germany | ..................... 56/14.6 |
| 1036293 | 8/1983 | U.S.S.R. | ..................... 56/14.6 |
| 1261579 | 10/1986 | U.S.S.R. | ..................... 56/14.6 |
| 1496684 | 7/1989 | U.S.S.R. | ..................... 56/14.6 |

*Primary Examiner*—Terry Lee Melius

[57] ABSTRACT

A harvesting method gathers and threshes grain in the field, leaving behind the straw. It removes chaff and weed seeds from the field with the harvested grain, and separates the chaff, grain leavings and weed seeds from the grain in a separate yard plant. The chaff, grain leavings and weed seeds are compacted and crushed in a mill for use as animal feed. The simplified harvest units have augmented holding tanks, one version of which can be attached to (and detached from) existing farm tractors. An automated integrated yard plant (1) separates and cleans harvested grain and (2) compacts and crushes chaff, grain leavings and weed seeds for use as animal feed.

11 Claims, 6 Drawing Sheets

5,794,423

MOBILE HARVESTER FOR CHAFF, GRAIN, GRAIN LEAVINGS AND WEED SEEDS

This invention concerns a harvesting system and method designed to simplify and improve existing grain crop harvesting techniques. The method threshes the harvested material and separates straw (or its equivalent) in the field from chaff, grain, grain leavings and weed seeds. The straw is spread back onto the field. The materials other than straw are transported to an automatic cleaning plant. Here the grain is separated and cleaned and the separated chaff is crushed, torn and densified and the grain leavings and weed seeds are also compacted and crushed in a single step for use as animal feed. The system includes a simplified harvester, and a single device processing plant, which separates the grain and densifies chaff and destroys weed seeds. Grain leavings include small kernels, cracked or split kernels, fines, leaves, hulls, stalks, stems, and the like, and are distinct from chaff. Chaff, grain leavings and weed seeds are present in dockage, the material other than grain from the combine harvesting process. Chaff, grain leavings and weed seeds are clearly visibly different from each other and grain.

Although the invention is described and referred to specifically as it relates to specific structures and methods for grain harvesting, it will be understood that the principles of this invention are equally applicable to similar structures and methods and accordingly, it will be understood that the invention is not limited to such structures.

BACKGROUND OF INVENTION

At present grain harvesting is carried out using combine harvesters, which thresh the grain in a threshing cylinder or rotor then separate out the grain from chaff, grain leavings, straw and weed seeds. The combine harvester keeps the grain and rejects the other material, which is left on the field. Its thresher breaks the grain from the stalk or pod. A degree of separation is achieved in rotary threshers by using apertures in the thresher tube which allow passage of grain. However the combine's separation process is not totally efficient, the straw portion includes grain, grain leavings, and chaff, and the grain portion includes chaff, grain leavings and straw. The straw portion is then usually passed along a straw walker to remove more grain from the straw. When the thresher is a cylinder and a concave, the concave has apertures to pass the grain portion, but again the straw portion is usually passed along a straw walker to remove additional grain from the straw. The grain portion, which in combines includes chaff, grain, grain leavings and weed seeds, are then passed through a sieve with air blowing upwards. This is called the shoe and includes the aspiration (blowing) and sieve (cleaning) apparatus. The grain falls downward, while chaff, grain leavings and weed seeds and any straw are blown upward. Chaff, grain leavings, straw and weed seeds are left as waste by-products in the field, while the grain is transported to storage. Thus the economic value of chaff, grain leavings and weed seeds for animal feed is lost. Moreover the present combine method spreads weed seeds through the fields, necessitating intensive, extensive and expensive pesticide and herbicide applications, whereas the new method collects chaff and weed seeds. The weed seeds are crushed thereby releasing their nutrients into chaff for animal feed.

The problem with chaff (and grain leavings and weed seeds) is simply that the farmer has enough problems at harvest without trying to handle chaff in addition to grain. The time and labor required to gather chaff, haul it to the farmyard and then mill it to destroy weed seeds are commonly just not available. Chaff on mixed farms is either browse fed in field or feedlot without milling. Weed seeds are spread through manure, and weed control is lost.

Other advantages of the new method compared to the present combining method are in a cleaner grain product, providing farmers with less dockage, higher prices and less freight demurrage. Total harvesting equipment will be less costly. Equipment depreciation is less because the automatic cleaning plant is separate and incurs less wear. The field unit is simpler because it has none of the cleaning and separating equipment of the combine. At present prices the yard plant and associated harvester together cost less than a new combine harvester.

Although the term 'grain' is primarily regarded as cereal grain referring to the seeds of grasses including many domesticated species, it is not limited thereto in instant application, since combine harvesters may be used as well for oilseeds, legumes and other domesticated plants. The term 'grain' is herein intended to cover besides the usual definition, all crops harvestable by combine harvesters, especially but not limited to all prairie crops including small grains, and specifically including the major popular crops of alfalfa, barley, beans, buckwheat, canola, clover, corn (maize), flax, grass (most varieties), lentils, lespedeza, millet, mustard, oats, (edible) peas, rice, rye, sorghum, soybeans, sunflower, (birdsfoot) trefoil, vetch, and wheat, which are regularly harvested by combines. As those in the art appreciate the above list is indicative rather than restrictive in nature, and other crops harvestable by combine harvester are covered by the term 'grain' as understood in the broad sense. The present invention is applicable to all combine harvestable crops which are referred to as 'grain' herein.

The new method has several substantial advantages over current practice. At present combines harvest grain, and there is no alternative. A combine's equipment cost can exceed US $150,000. Under the new method the two unit equipment cost is US $95,000. The two units can be traded independently, thus giving farmers more flexibility in purchase decisions.

An environmental goal is to add value to waste. Chaff is currently left on the field as waste. Tests show chaff can be removed with no detrimental effects to soil. Chaff has value as animal feed (worth US $7.50 per acre). The new method removes chaff from the field cost effectively. There are other chaff collection methods available which are expensive, awkward, require more labor, but are not in common use.

Removal of chaff results in field advantages. Chaff rows, which may adversely affect minimal till seeding, are eliminated. Fertilizer application is often prevented from entering the soil by crop residue, which is mostly chaff by volume. The new method's removal of crop residue other than straw gives a cleaner field.

The new method produces cleaner grain reducing grain dockage and freight demurrage.

Grain loss from the combine's shoe is eliminated, which recovers an average of 1 to 2% more grain than conventional combine methods, which is a saving of about US $1,500 for a 700 acre field.

Combines return and spread weed seeds on the field creating weeds and weed patches. The new method doesn't spread weed seeds by collecting up to 250,000 weed seeds per acre with the chaff, thereby lowering pesticide (herbicide) and tillage requirements. The collected weed seeds are crushed in the method's yard plant, and their fat and protein adds to the collected chaff's feed value.

Volunteer growth is greatly reduced, both by decreasing grain loss and by collecting chaff. In dry years the small grain kernels, formerly left on the field, are collected with the chaff and enhance its feed value.

The new method is efficient. The field, or harvesting unit's has a larger grain bin (up to about three to four times as large as the combine's grain bin) and need be emptied every 10 acres, as opposed to 6 acres for a combine, even though the unit is collecting more material from the field. Since the yard plant has a consistent throughput, the grain cleaning unit, which is preferably electric, operates automatically, and can be left unattended. There is no need to keep up with the field harvesting process, as grain can be cleaned 24 hours per day.

The yard plant preferably contains a specifically designed roller mill which densifies the chaff, enhancing its value for transport and sale to feed lots.

A grain dryer can easily be incorporated into the yard plant.

PRIOR ART

Applicant is unaware of any closely related prior art.

It is a principal object of the invention to harvest all, or as many crops, as possible. It is a further principal object to reduce grain loss during harvesting. It is a further principal object to provide a cleaner grain product. It is a further principal object to remove chaff, grain, grain leavings and weed seeds from the harvested field. It is a further principal object to leave only straw in the harvested field. It is a further principal object to use compacted and crushed chaff and weed seeds as animal feed, especially for stock raising especially cattle. It is a further principal object to provide chaff nutritionally enhanced by the nutrients from crushed weed seeds and crushed grain leavings. It is a subsidiary object to remove undersized grain kernels, fines and other grain leavings from the harvested field, and to unite these with the chaff and weed seeds as animal feed. It is a further subsidiary object to provide a lighter, faster, more energy efficient, simpler and less expensive field harvester with greater capacity. It is a further subsidiary object to increase the use and hence productivity of farm grain trucks. It is a further subsidiary object to use an automatic, separate, cleaning plant, which is both more efficient in cleaning and more energy efficient than the mobile fuel powered combine cleaning plant. It is a further subsidiary object to reduce volunteer grain growth. It is a further subsidiary object to collect and destroy weed seeds from the harvested field, and reduce weed infestation. It is a further subsidiary object to reduce pesticide and herbicide use. It is a further subsidiary object to reduce fertilizer use. It is a further subsidiary object to provide animal feed for stock raising especially cattle. It is an all embracing object of the invention to increase farm income. It is an all embracing object of the invention to reduce farming costs, which all of the above listed objects individually achieve. Further subsidiary objects are lower equipment costs and associated depreciation costs, lower fuel costs, elimination of chaff, and cleaner fields. Other objects will be apparent to those skilled in the art from the following specification, accompanying drawings and appended claims.

DESCRIPTION OF THE INVENTION

The project follows three years of work. An economic study including patent and literature searches, obtaining learned comments, preliminary economic analysis, costing and layouts has been performed. Over 900 titles and abstracts were reviewed. Applicant found no other party working on a system and method to separate straw on the field and bring all other crop material back to a separate farm plant for further processing. A prototype full sized yard plant including the cleaning unit has been designed, built and tested.

There is research activity relating to certain areas of the method, for example: the value of weed removal (Entz, University of Manitoba); the value of chaff collection (Strumburg, Agri-Food Canada at Swift Current); air flow pressures for moving grains (Sokhansanj, University of Saskatchewan). There is however no research being undertaken for a comparable new harvesting technology. Contact has been made with universities (North Dakota, South Dakota State, Minnesota, Iowa State, Montana, Alberta, Saskatchewan, Manitoba), equipment institutes (Prairie Agricultural Machinery Institute, Alberta Farm Machinery Institute, Saskatchewan Research Council), government (Agri-Food Canada, Prairie Farm Rehabilitation Administration, and the provinces of Manitoba, Saskatchewan, Alberta), other organizations (Manitoba Hydro, Transalta Utilities, the U.S. National Food and Energy Council, U.S. Electric Power Research Institute, United Grain Growers) and farm organizations (Manitoba Cattle Producers, Western Canadian Wheat Growers, Zero Till Association, Keystone Agricultural Producers). More than 200 acknowledged specialists in their fields have been consulted. All are unaware of similar research.

Manitoba Hydro, the Agricultural Technology Alliance of the Electric Power Research Institute (U.S.), and the Canada-Manitoba Agricultural Sustainability Program provided financial research assistance, while the Western Canadian Wheat Growers Association and Manitoba Cattle Producers provided research assistance.

In one broad aspect the invention is directed to a method of harvesting field crops comprising the steps of cutting a field crop, then threshing the cut crop, followed by separating the threshed crop into a straw portion including substantially all the straw, and a chaff, grain, grain leavings and weed seed portion including substantially all the chaff, grain, grain leavings and weed seeds. The straw portion may be deposited on the field for baling, or it may be chopped, shredded and spread on the field for decomposition.

In a further broad aspect the invention is directed to a method of harvesting field crops comprising the step of separating a cut threshed field crop into two portions, a straw portion including substantially all the straw, and a chaff, grain, grain leavings and weed seed portion including substantially all the chaff, grain, grain leavings and weed seeds.

In a further broad aspect the invention is directed to an improved method of harvesting field crops the providing the step of collecting substantially all chaff, grain leavings and weed seeds with the grain in the absence of collecting straw. More preferably the collected chaff, grain, grain leavings and weed seeds are transported to a separating plant. Preferably the field crop is previously cut, threshed, then separated into two portions, a straw portion including substantially all the straw, and a chaff, grain, grain leavings, and weed seed portion including substantially all the chaff, grain, grain leavings and weed seeds.

A substantial advantage of collecting the chaff and grain leavings with the threshed grain lies in ease of material handling. This is an advantage in both the field harvesting unit and later. Chaff and grain leavings must be united with the threshed grain for ease of handling. Threshed grain kernels flow like a liquid or fluid. Chaff alone doesn't flow well and tends to bridge. Grain leavings also don't flow well alone. Grain kernels are flowable or pourable, which can thus be moved by auger. Since chaff and grain leavings tend to bridge when passing through narrow openings, they must be mixed with flowable or pourable material for ease of handling. The only practical way to move chaff and grain leavings is when mixed with threshed grain, which is flowable or pourable. Unthreshed grain, heads or ears, does not flow well. For grain and by-products to be easily handleable, the grain must be threshed and the by-products must be mixed in with the grain. Straw also does not flow alone. In practice the grain is best threshed in the field, then the flowable mixture of chaff, grain, grain leavings and weed seeds transported elsewhere for cleaning and separating. To further improve viscosity and assist with the flow of material to be moved, simple agitating devices can be added to the system at points where the material flows from one space to another.

Another advantage of having the chaff, grain, grain leavings and weed seeds mixed together, when removed from the field, is the heavy grain (60 lbs/cu. ft.) helps compress the relatively light (4.5 lbs/cu. ft.) chaff and grain leavings mixture. Tests demonstrate that the compression factor is typically about 69 to 70% of the volume of the grain and the chaff and grain leavings (and weed seeds) removed from the field independently.

After harvesting the chaff, grain, grain leavings and weed seeds portion is transported to a separate plant, where it is separated into two portions, a grain portion including substantially all the grain, and a chaff, grain leavings and weed seeds portion including substantially all the chaff, grain leavings and weed seeds, which may be then treated with anhydrous ammonia. The chaff grain leavings and weed seeds portion is then treated to tear and compact the chaff, and compact and crush grain leavings and weed seeds, preferably by milling, after which it may be treated with anhydrous ammonia. While the chaff grain leavings and weed seeds may be fed directly to animals, it is preferred to ammoniate both to enhance the nutritional value of the feed and kill weed seeds. It is also preferred to compact and crush weed seeds and grain leavings to release their nutrients into the chaff, as well as killing the weed seeds.

In another broad aspect the invention is directed to a mobile system for harvesting chaff, grain, grain leavings, and weed seeds from field crops comprising sequentially header means, elevator means, thresher means, straw separation means and straw discharge means.

The thresher means has therein aperture means of such size to allow chaff, grain, grain leavings and weed seeds, but not straw, to pass therethrough to holding tank means. This system may be self-propelled.

In another broad aspect the invention is directed to a wrap-around mobile harvesting system, comprising sequentially header means, elevator means, thresher means, straw separation means and straw discharge means. The system is detachably towable by tractor vehicle means, with means to power the system engageable with power take off means on the tractor vehicle means. This wrap-around system may have thresher means and straw separation means with aperture means of such size to allow chaff, grain, grain leavings and weed seeds, but not straw, to pass therethrough to holding tank means. In a further broad aspect the wrap-around system includes chaff aspirating means, screening means for larger material than grain, and screening means for smaller material than grain, and holding tank means for the grain. That is it is a wrap-around combine.

All the mobile harvesting systems indicated above preferably have straw discharge means, which may include chopper, shredder and spreader means. The straw discharge means may be detachably attached to the mobile system. Auger means may convey material other than straw from the thresher means to the holding tank means. The thresher may be rotary having therein aperture means of such size to allow chaff, grain, grain leavings and weed seeds, but not straw, to pass therethrough. The thresher means may have cylinder means cooperating with concave means having therein aperture means of such size to allow chaff, grain, grain leavings and weed seeds but not straw to pass therethrough. Tine rotor means may be present cooperating with grating means subsequent to the concave means, or to the rotary thresher means. The grating means have aperture means of such size to allow chaff, grain, grain leavings and weed seeds but not straw to pass therethrough. Other straw separation means such as straw walker means may be used subsequent to the thresher means. Auger means are usually operatively associated with the holding tank means.

The harvester is being fabricated for field-testing.

Previously grain is first cleaned in the combine, then cleaned again elsewhere (elevator, cleaning mills and the like). Now using the invention the grain is not first cleaned in the combine, the harvested grain, chaff, etc., mixture is instead cleaned outside the combine to superior standards compared to the combine. The cleaning system of the invention handles a different mixture from other cleaning plants.

DESCRIPTION OF THE PREFERRED EMBODIMENTS

Figure 1:
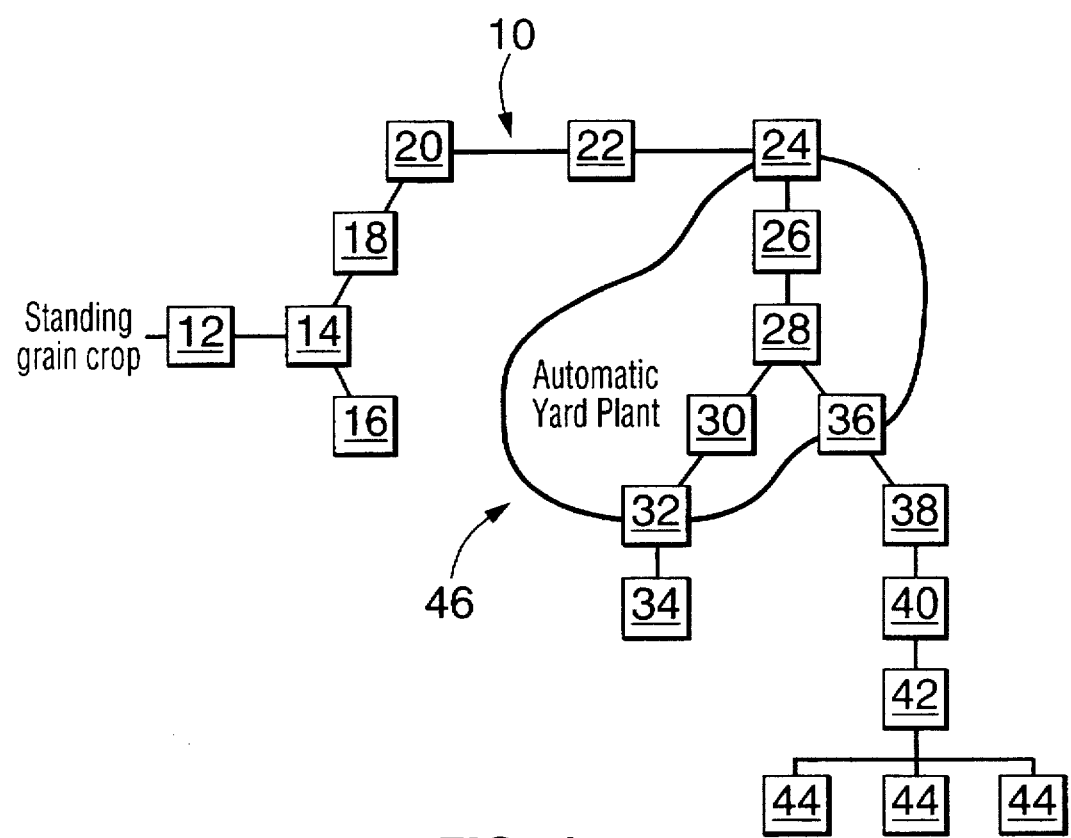
FIG. 1 shows a flow chart to illustrate an embodiment of the system of the invention.
Figure 2:
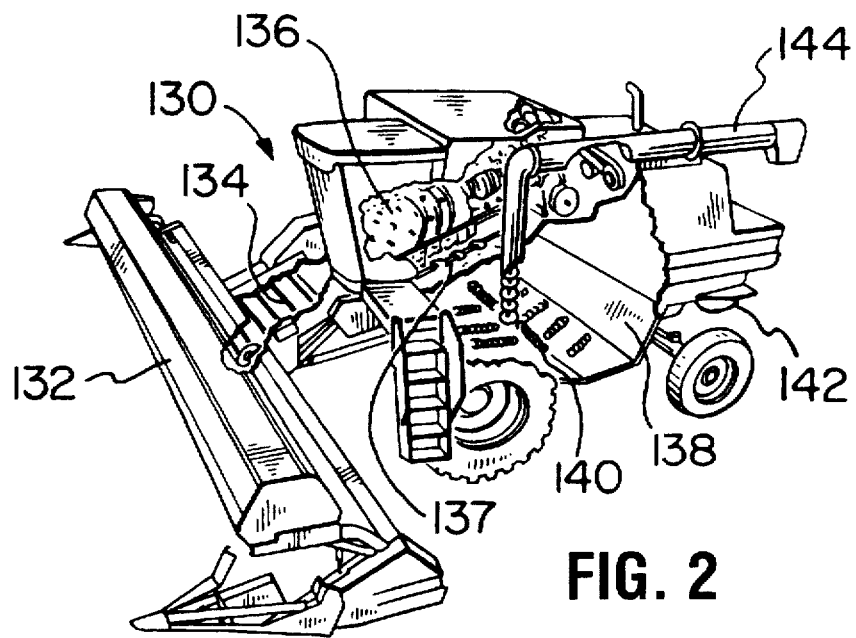
FIG. 2 shows an exploded view of an embodiment of a self-propelled thresher of the invention.
Figure 3:
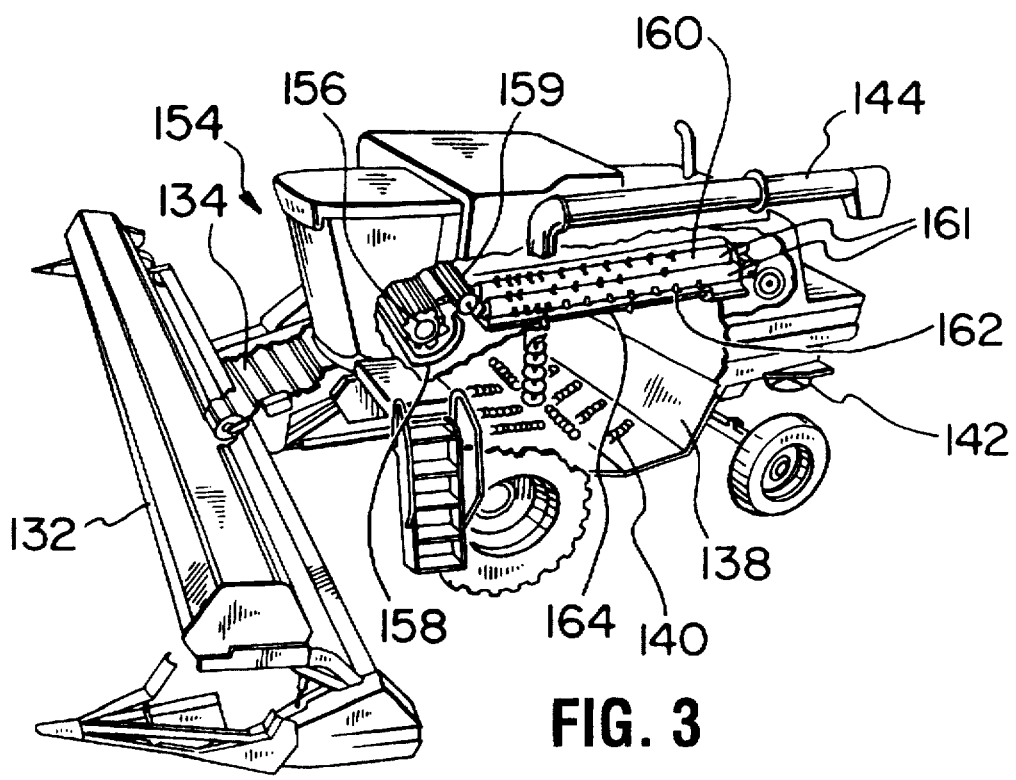
FIG. 3 shows an exploded view of an embodiment of a self-propelled thresher of the invention.
Figure 4:
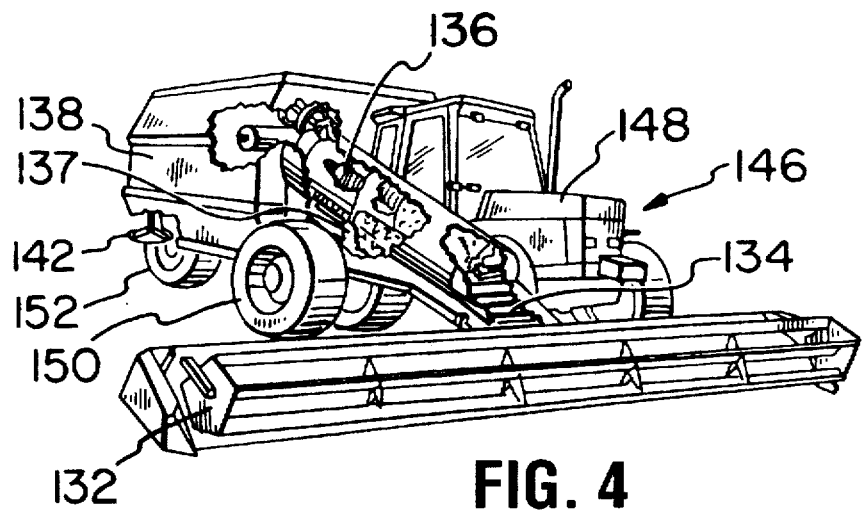
FIG. 4 shows an exploded view of another embodiment of a wrap-around thresher of the invention.
Figure 5:
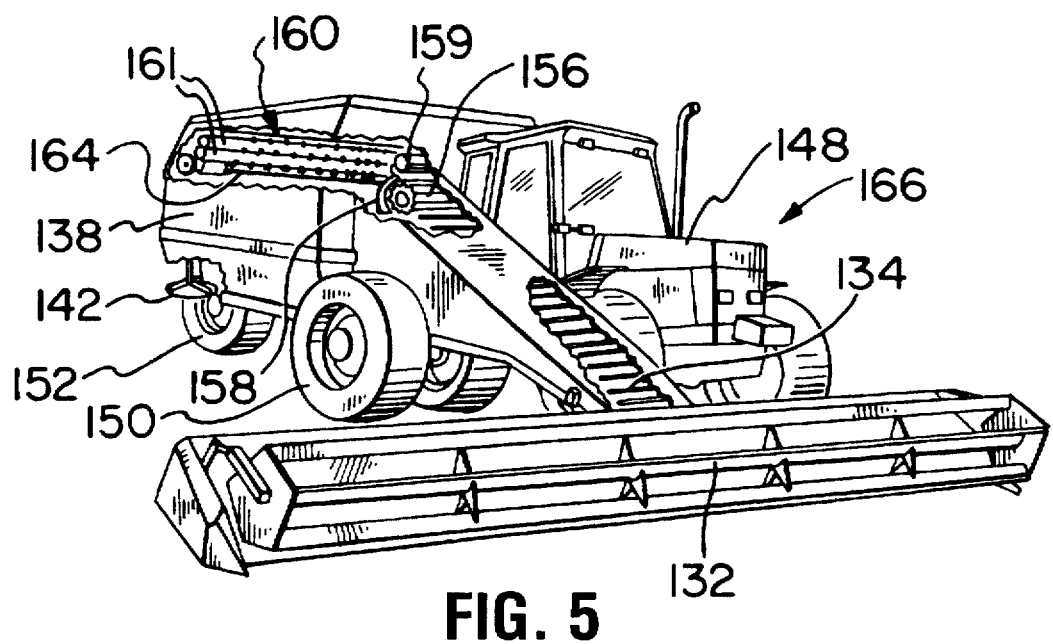
FIG. 5 shows an exploded view of another embodiment of a wrap-around thresher of the invention.

The invention is now illustrated by reference to the preferred embodiments thereof. The numeral 10 generally indicates a system of the invention (FIG. 1), header 12, which may pick up a swath, direct-cut or strip-cut the standing grain crop. The header cuts the crop leaving behind stubble at a height chosen by the farmer. Harvester 14 is directly attached to header 12, and includes a thresher to thresh the grain. The grain, chaff, grain leavings and weed seeds proceed together into a holding tank integral with the harvester, desirably with a bottom agitator to help flow from the plant. The holding tank is preferably at least about twice up to about three or four times the size of those currently in use on combines. The separated straw is deposited in the field at the farmer's pleasure either directly as threshed for baling, or optionally through straw chopper, shredder and spreader 16 to decompose in the field.

Built into harvester 14 is high volume and time saving auger 18, which is used to load field truck 20. As truck 20 preferably has truck box sides raised by about 3 feet above normal to increase load capacity, the auger arm is raised to clear these. Wheat chaff, weed seeds and wheat grain are considered to have about twice the volume of wheat grain alone, and about 1.16 times the weight of wheat grain alone. Volume and weight ratios vary with crop harvested and moisture content, as those skilled in the art are aware.

Figure 7:
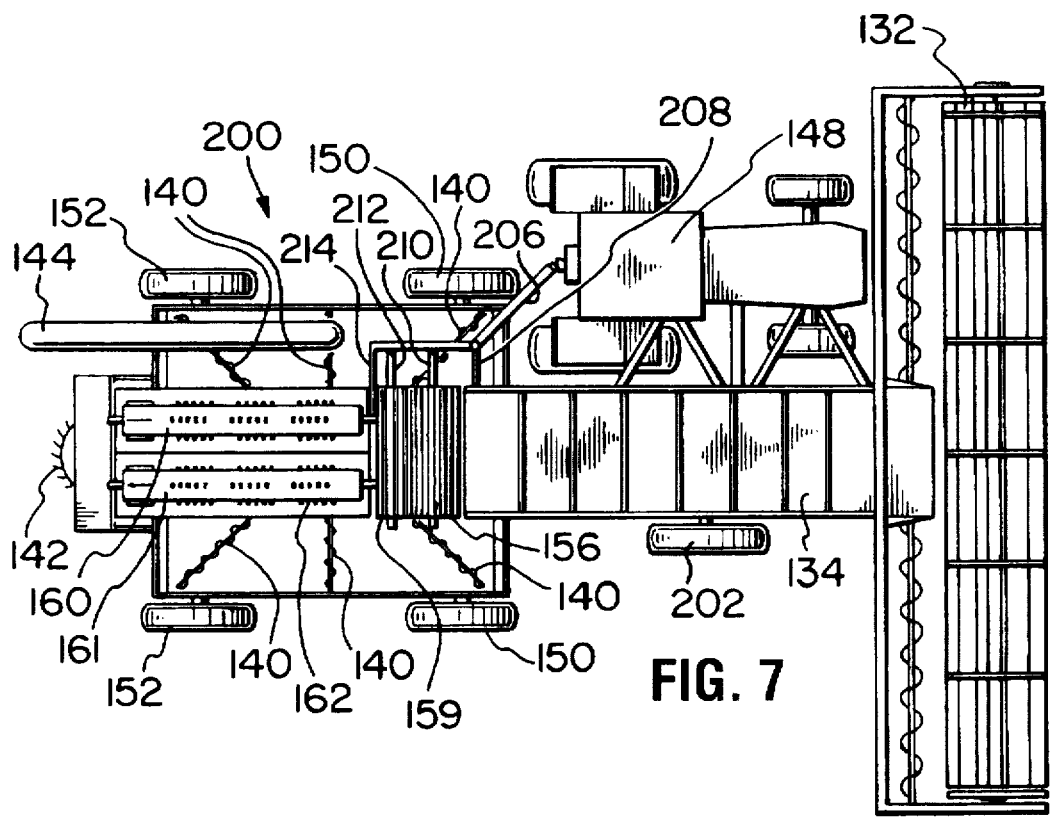
FIG. 7 shows a top part sectional view of the embodiment of FIG. 6.
Figure 6:
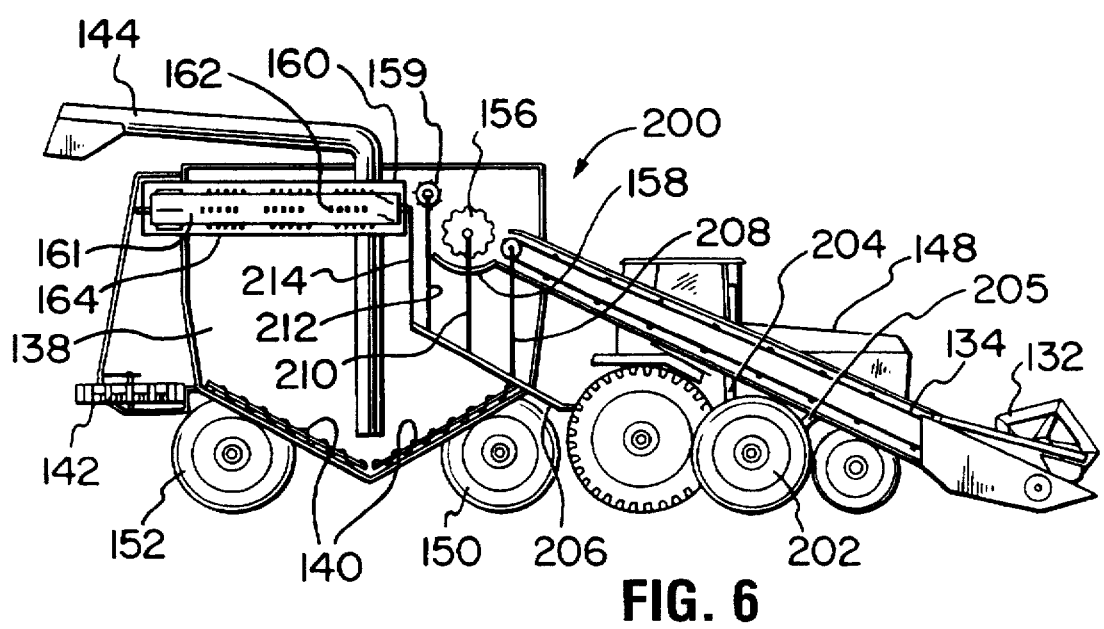
FIG. 6 shows a side part sectional view of another embodiment of a wrap-around thresher of the invention.
Figure 8:
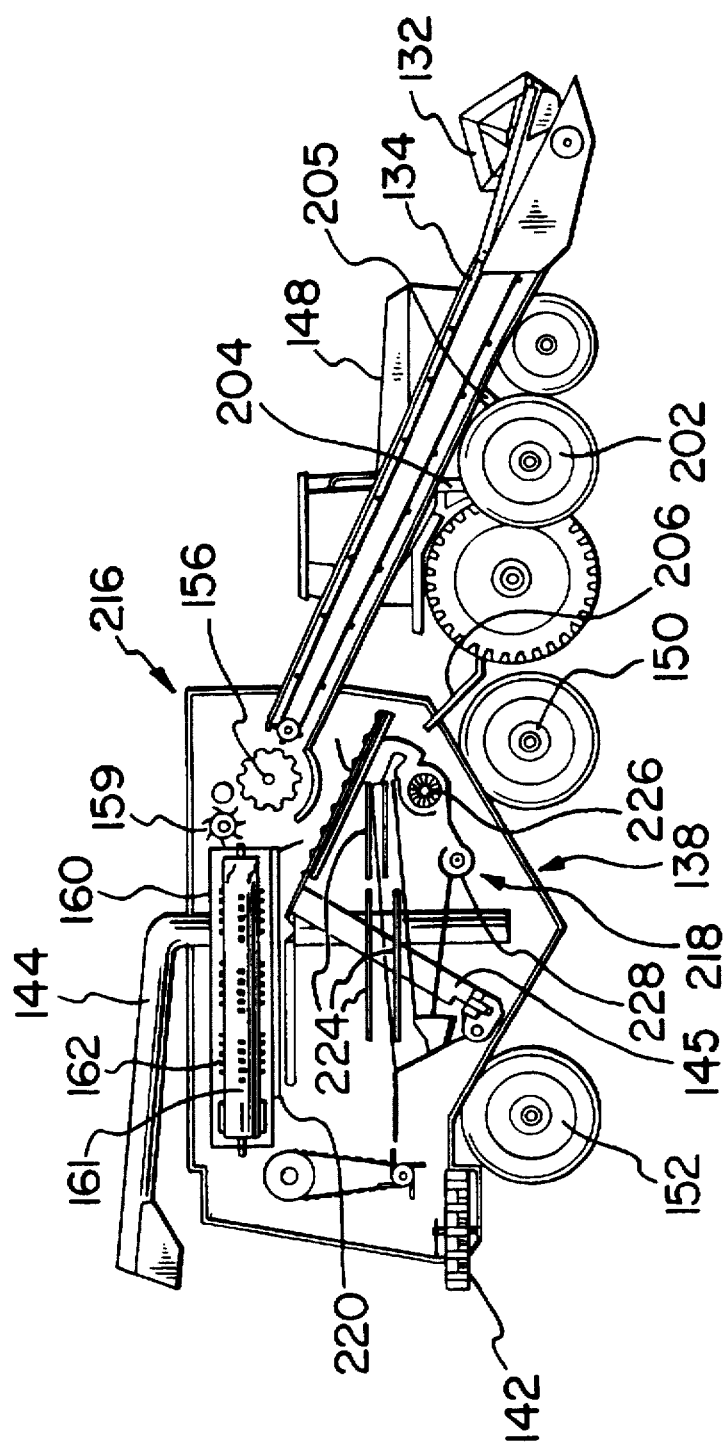
FIG. 8 shows a side part sectional view of another embodiment of a wrap-around combine of the invention.
Figure 9:
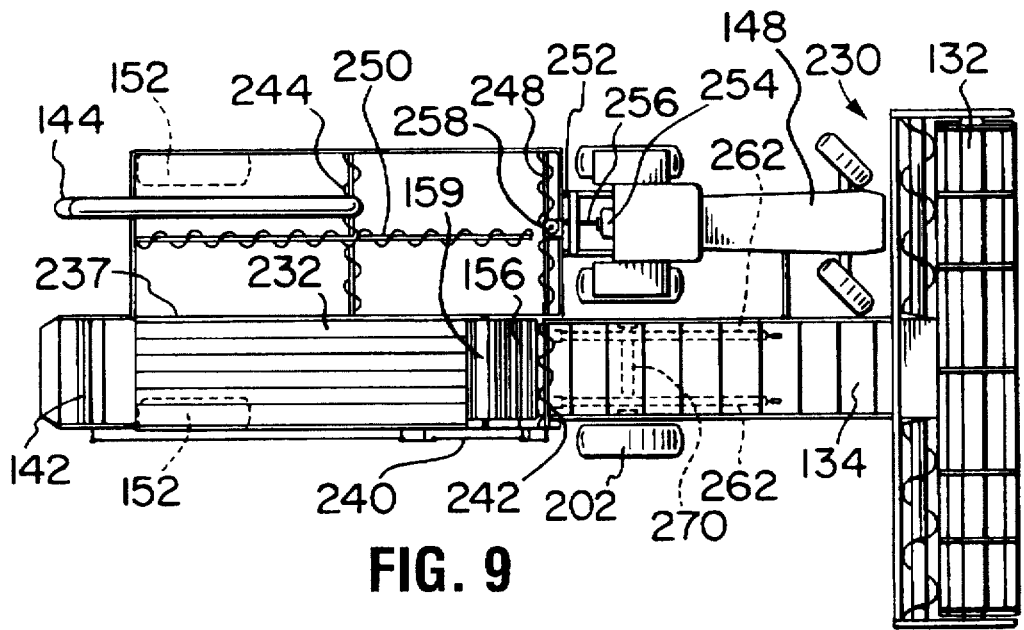
FIG. 9 shows a top part sectional view of another embodiment of a wrap-around thresher of the invention.
Figure 10:
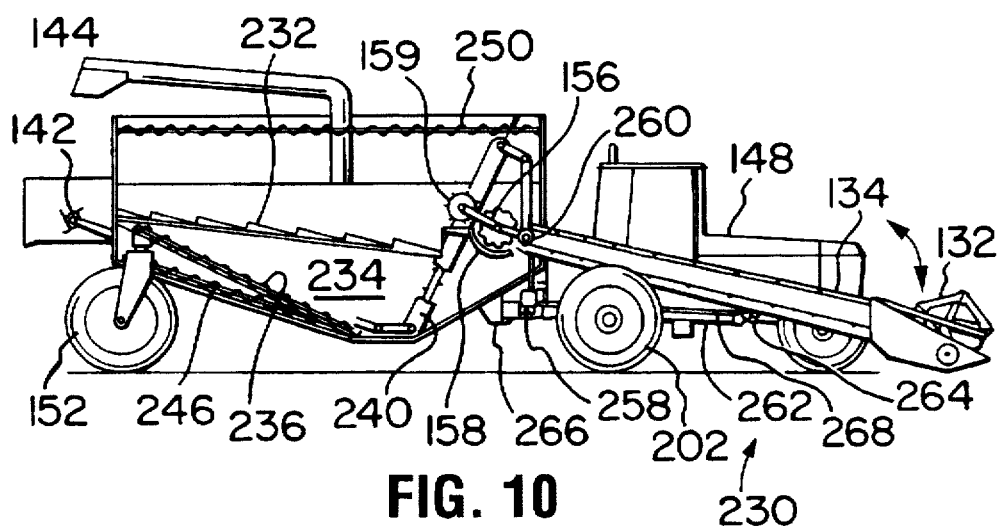
FIG. 10 shows a side part sectional view of the embodiment of FIG. 9.
Figure 11:
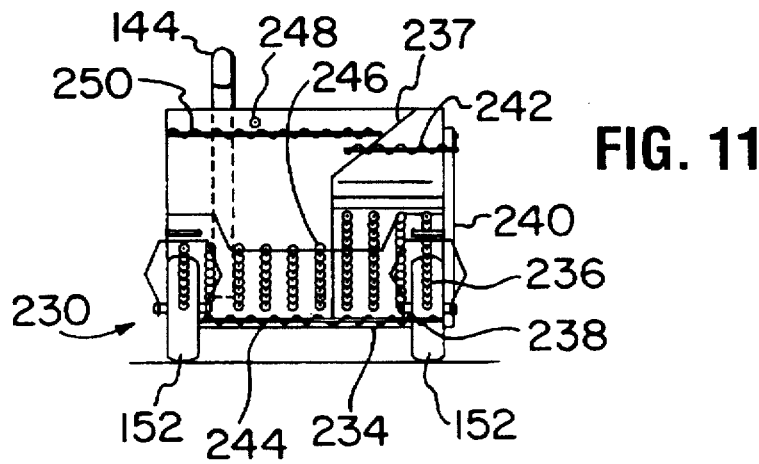
FIG. 11 shows a rear part sectional view of the embodiment of FIG. 9.

FIGS. 2 to 11 indicate specific threshers: self-propelled thresher 130, (FIG. 2), self-propelled thresher 154 (FIG. 3), wrap-around thresher 146 (FIG. 4), wrap-around thresher 166 (FIG. 5), wrap-around thresher 200 (FIGS. 6 and 7), wrap-around thresher 216 (FIG. 8) and wrap-around thresher 230 (FIGS. 9 to 11), which have conventional interchangeable header 132, which as those skilled in the art realize can be a direct cut, swath pick-up, or stripper header. Elevator 134 carries the cut crop to rotary thresher 136, or thresher cylinder 156 and cooperating concave 158, which separates the straw from the rest of the crop. In the self-propelled versions of the thresher, 130 and 154, elevator 134 is 64½ inches wide as are rotary thresher 136, or thresher cylinder 156 and concave 158. In the wrap-around versions elevator 134 is 55 inches wide as are rotary thresher 136, or thresher cylinder 156 and concave 158. Either rotary thresher 136, or concave 158 may include apertures to allow grain and other material except straw to pass directly into holding tank 138. Material other than straw may be carried by conveyor augers 137 to holding tank 138, optionally equipped with agitators 140. Straw and other material mixed therewith may be passed by overshot beater 159 into tine separator 160, which has paired side by side tine separators containing tine rotors 161 having tine arrays 162 thereon. Material is urged along the tine separators smaller material than straw passing through gratings 164 into holding tank 138, emptied by unloading auger 144. In wrap-around 230, straw and other material is passed by overshot beater 159 onto straw walker 232, which is about fifteen feet long, allowing material other than straw to fall into collection tank 234, as does material passing through concave 158. Bottom auger array 236 in collection tank 234 urge the material other than straw to transverse auger 238 which carries it to elevator 240. At the top of elevator 240, transverse auger 242 carries the material other than straw into grain bin 138, separated from collection tank 234 by internal wall 237. Grain bin 138 has bottom transverse auger 244, which carries material to the base of unloading auger 144. Grain bin 138 also has bottom auger array 246 to urge material to transverse auger 244. There are also transverse and longitudinal top leveling augers 248 and 250, respectively. Wrap-around 230 is attached to tractor 148 by triple hitch 252. Tractor PTO 254 drives shaft 256 and gearbox 258, which drives all the moving parts through a system of shafts, belts and sheaves. Elevator 134 is driven by shaft 260, which through a belt and sheave system also drives thresher 156 and overshot beater bar 159, elevator 240 and straw spreader 142. Elevator 134 and header 132 are raised and lowered by hydraulic cylinders 262 which are attached to the elevator by front cylinder supports 264 and to outside of grain bin 138 by cylinder supports 266. Elevator 134 has elevator frame 268, enabling support wheel 202 and support wheel axle 270 to support elevator 134. Wrap-around 230 is about 13 feet wide, 22 feet long and 12 feet high, not including unloading auger 144, it has a total capacity of some 1179 cubic feet or approximately 950 bushels. The wrap-around versions 146, 166, 200, 216, and 230 are mounted on conventional tractor, 148, and operated by the usual tractor PTO (power take-off), which requires about 200 H.P. In FIGS. 7 and 8, the tractor PTO operates shaft 206 which powers elevator 134, thresher cylinder 156, overshot beater 159 and tine rotors 161 by gear belt drive (also known as HDT, timing belt, or poly-chain) through belt and sheave arrangements 208, 210, 212, and 214. In version 200 (FIGS. 7 and 8), a support wheel 202 with support struts 204 and 205 is provided for elevator 134. In all versions straw spreader 142 spreads straw on the field. These threshers all feature a large holding tank and lack grain cleaning equipment, except 216.

FIG. 8 shows wrap-around combine 216, which embodies conventional combine grain cleaning equipment 218, including, screen 220, distribution auger 222, sieves 224, aspirator fan 226, which blows chaff, weed seeds and grain leavings out, and tray 228 with accompanying auger. Auger 144 is also shown in alternative nonuse position 145.

Thus far the process has harvested all the grain. Using existing combine methods substantial amounts of grain are put back on the field with the chaff, 6.4% for wheat, 5.2% for barley and 3.7% for canola, as percentages of total chaff weight. Combine grain average losses (as distinct from header grain losses) are estimated at between 3.375% to 3.75% for wheat, 3% for barley and 2.875% for canola, as percentages of total grain harvest. These losses are due to the thresher, the straw walker and the shoe (blowing aspirator and cleaning sieve). Harvester 14 of the invention doesn't have a shoe, thus saving grain loss from the shoe.

The weed seeds harvested will amount to about 50% of weed seeds available at harvest time.

Besides the value of capturing more grain, less grain loss means less volunteer growth. In addition the removal of weed seeds with the grain will substantially reduce weed growth.

Numeral 22 sets forth another high volume, time saving, auger unloads the grain truck into surge receiving bin 24, which is part of automatic yard plant 46. Surge bin 24 has a large holding capacity and preferably a bottom agitator to ensure steady flow into automatic yard plant 46. Auger 26 carries the chaff, grain and weed seeds to stationary separating and cleaning machine 28. Combine harvested grain must be cleaned again for market purposes. Machine 28 has more cleaning stages than combines, and produces a significantly cleaner product than combine harvested grain, which is typically docked by 2 to 4% for uncleaned grain. Yard cleaned grain will be 'commercial' quality, with about 1% dockage. The stationary yard cleaning machine 28 has the advantages that it is easier, simpler and cheaper to clean and maintain than the combine cleaning machine which is intricate, in a small space, awkward and expensive to repair and maintain. Because it is stationary yard cleaning machine 28 takes less shock and vibration than the combine cleaning machine, and thus lasts longer and depreciates less. Since the yard cleaning machine is built on a solid foundation it can be advantageously positioned for each individual farm. The cleaned grain is then carried by auger 36 to optional grain dryer 38, which can be incorporated into automatic yard plant 46, more easily, simply and with less labor than the present system. Grain dryer 38, when available makes drying easier and so enhances grain quality, it can also extend the harvest time. The grain whether passed through grain dryer 38 or not, is then passed to bin 40, whence it may be carried by optional auger 42, usually a stationary overhead auger, to optional storage bins 44. The grain can be advantageously directed to selected bins separately to even out moisture or quality. The residue of chaff and weed seeds from cleaning machine 28 is carried to crushing, tearing and densifying machine 30 preferably a hammermill, or roller mill, which tears, densifies (compacts) and crushes the chaff, preferably to double its original density, while compacting and crushing the weed seeds. The chaff may then be moved by auger 32 to chaff bunker 34, which is desirably covered by a tarp, to prevent blowing, alternatively the chaff can be moved by front end loaders.

The removal of chaff and weed seeds and the reduction of grain loss on the fields will reduce weed and volunteer grain growth. Because weed and volunteer grain growth is reduced pesticide and herbicide use is also reduced, which in turn reduces unwanted chemical environmental effects. The absence of chaff will aid zero-till planting. As it eliminates chaff rows, which interfere with seeding. It will also reduce fertilizer use, as it eliminates chaff clumps and rows on the field, which act as barriers for fertilizer to penetrate the soil. Chaff contributes little to soil nutrition, so its removal causes little loss in soil nutrition, compared to straw. The presence of chaff tends to interfere with germination of subsequent crops. Furthermore the use of chaff-weed seed as cattle feed will result in increased availability of manure for fertilizer.

The system is designed to harvest all prairie crops including cereal crops, oil seeds, and legumes, including mustard, lentils and beans, to support modern crop rotational methods.

The economic value of the method was assessed to be:

| Capital savings | |
| --- | --- |
| Harvesting Equipment Savings | U.S. $35,000 |
| Operational savings | |
| Chaff collection (wheat) | U.S. $7.35/acre |
| Chaff collection (barley) | U.S. $4.80/acre |
| Chaff collection (canola) | U.S. $8.05/acre |
| Weed collection (less herbicide) | U.S. $3.70/acre |
| Additional grain (less loss) | U.S. $2.45/acre |
| Cleaner grain (less dockage) | U.S. $0.55/acre |
| TOTAL SAVINGS (WHEAT) | U.S. $14.05/acre |

These figures are conservative since they are based on the estimated market value of currently collected conventional combine chaff. The milled chaff, grain leavings and weeds seeds product of the new method, both wheat and barley, has been inspected by experts, and pronounced of better quality to conventional chaff, as they are much richer in starch, protein and fat.

As those skilled in the art would realize these preferred described details and materials and components can be subjected to substantial variation, modification, change, alteration, and substitution without affecting or modifying the function of the described embodiments.

Although embodiments of the invention have been described above, it is not limited thereto, and it will be apparent to persons skilled in the art that numerous modifications and variations form part of the present invention insofar as they do not depart from the spirit, nature and scope of the claimed and described invention.

I claim:

1. A mobile harvester for harvesting a mixture of chaff, grain, grain leavings, and weed seeds from a field crop, comprising:

a header for cutting and collecting a field crop from an area of land to produce a cut crop;

an elevator for conveying the cut crop away from the header;

thresher equipment, positioned to receive the cut crop from the elevator, for threshing the cut crop to separate chaff, grain, grain leavings and weed seeds from straw;

a straw separator having apertures of such a size as to allow chaff, grain, grain leavings and weed seeds to pass therethrough, while substantially preventing straw from passing therethrough, thus producing a separate straw component and a mixture of chaff, grain, grain leavings and weed seeds;

a straw discharge for returning said straw component to said area of land;

a holding vessel to receive and hold said mixture of chaff, grain, grain leavings and weed seeds; and a discharge to permit removal of said mixture of chaff, grain, grain leavings and weed seeds from the harvester in an unclassified condition;

said header, elevator, thresher equipment, straw separator, straw discharge, and holding vessel all forming part of a mobile unit.

2. The harvester of claim 1, wherein said discharge to permit removal of said mixture comprises an elevator for discharge of said mixture of chaff, grain, grain leavings and weed seeds from said holding vessel.

3. The harvester of claim 1, further comprising an integral propulsion unit that makes the unit self-propelled.

4. The harvester of claim 1, including an attachment for connection to an agricultural vehicle for propulsion of said unit.

5. The harvester of claim 4, wherein said agricultural vehicle has a front, a side and a rear, and wherein said unit is shaped to fit around at least said front, side and at least part of said rear of said vehicle when attached thereto via said attachment.

6. The harvester of claim 4, wherein said separator comprises a straw walker provided with said apertures.

7. The harvester of claim 4, wherein said separator comprises a tine rotor cooperating with a grating provided with said apertures.

8. The harvester of claim 1, wherein said thresher is a rotary thresher.

9. The harvester of claim 1, wherein said thresher comprises a cylinder and a complementary concave unit.

10. The harvester of claim 1, wherein said straw discharge includes a straw spreader for distributing straw as the straw exits said discharge.

11. The harvester of claim 2, wherein said elevator for said discharge comprises an auger.

* * * * *